(No Model.)

E. L. MANSFIELD.
COUNTERSINKING DEVICE.

No. 303,303. Patented Aug. 12, 1884.

Witnesses.
S. N. Piper
E. B. Pratt

Inventor.
Edwin Laselle Mansfield.
by R. H. Eddy atty.

N. PETERS, Photo-Lithographer, Washington, D. C.

UNITED STATES PATENT OFFICE.

EDWIN LASELLE MANSFIELD, OF BOSTON, MASSACHUSETTS.

COUNTERSINKING DEVICE.

SPECIFICATION forming part of Letters Patent No. 303,303, dated August 12, 1884.

Application filed March 3, 1884. (No model.)

*To all whom it may concern:*

Be it known that I, EDWIN LASELLE MANSFIELD, of Boston, in the county of Suffolk, of the Commonwealth of Massachusetts, have invented a new and useful Improvement in Implements for Boring or Countersinking; and I do hereby declare the same to be described in the following specification and represented in the accompanying drawings, of which—

Figure 1:
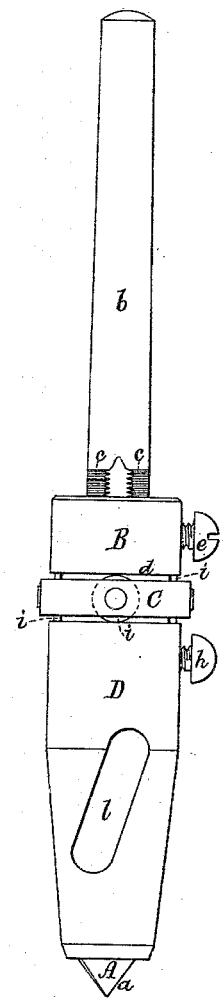
Figure 2:
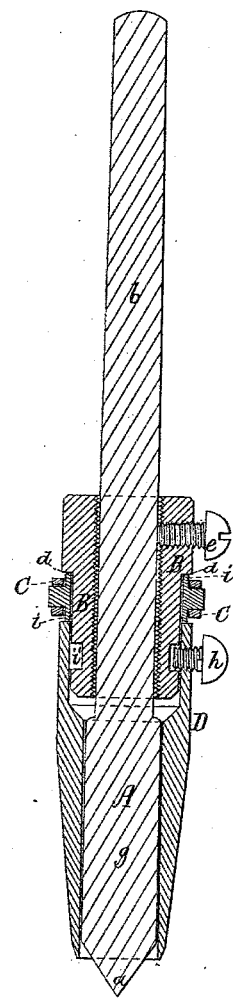

Figure 1 is a side view, and Fig. 2 a longitudinal section, of a countersinking implement having my invention, the nature of which is defined in the claims hereinafter presented.

In such drawings, A denotes a countersinking-bit having an angular cutting end, $a$. The shank $b$ of such bit is screw-threaded, as shown at $c$, to screw into and through a cylindrical nut, B, provided with a shoulder, $d$, as represented. This nut has screwed into it transversely a check-screw, $e$, to bear against the screw-threaded shank. Instead of such check-screw, there may be a check-nut on the screw $c$, to screw against the upper end of the nut B. Encompassing the nut B is a ring, C, provided with a series of friction-rollers, $i$, to bear at their peripheries against the shoulder $d$, and also against the upper or larger end of a tapering sleeve or tube, D, that encompasses the nut B and the blade $g$ of the bit, and is revoluble on the nut, and is held in place thereon by a screw, $h$, screwed into such sleeve, and a groove, $i'$, made within and encircling the nut. The sleeve is to determine the depth to which the bit is to enter a hole to be countersunk, and such sleeve is adjustable relatively to the bit by the nut B, such nut, after having been revolved to effect any such adjustment, being by the check-screw $e$ kept from accidentally revolving on the shank of the bit. The bit while revolving having reached the required depth in countersinking a hole, the sleeve will be borne against the surface from which the countersink may extend, and in consequence thereof will prevent the bit from entering farther into the hole, and by being forced against the series of friction rollers or wheel the sleeve will be kept from being revolved with and by the bit and nut. Were the sleeve to bear directly against the shoulder $d$ of the nut, the said sleeve would be liable to be revolved with the bit, and in so doing to mar or injure the surface adjacent to the countersink made by the bit. By having the ring and its series of friction-rollers arranged as represented, the sleeve, when its lesser end may be in contact with the surface to be countersunk, will be at rest or not so revolved to injure or cut into such surface, though serving at the time to define the depth of penetration of the bit. The sleeve is or may be provided with one or more chip-discharging openings, $l$, made in it, as represented.

I claim—

1. The combination of a boring or countersinking bit having its shank screw-threaded, as described, and a screw-nut arranged on the screw of the shank, provided with a shoulder and a check-screw, as represented, with a sleeve encompassing the blade of the bit, and supported by and revoluble on the nut, as set forth.

2. The combination of a boring or countersinking bit having its shank screw-threaded, as described, and a screw-nut arranged on the screw of the shank, provided with a shoulder and check-screw, as represented, with a sleeve encompassing the blade of the bit, and encircling and revoluble on the nut, and with a ring surrounding the nut, provided with a series of friction-rollers adapted to bear against the shoulder of the nut and the larger end of the sleeve, all being substantially and to operate as set forth.

EDWIN LASELLE MANSFIELD.

Witnesses:
R. H. EDDY,
E. B. PRATT.